US007143187B1

(12) United States Patent
Takeda et al.

(10) Patent No.: US 7,143,187 B1
(45) Date of Patent: Nov. 28, 2006

(54) PACKET COMMUNICATION CONTROL DEVICE AND PACKET COMMUNICATION CONTROL METHOD

(75) Inventors: Yukiko Takeda, Tokorozawa (JP); Hidenori Inouchi, Higashimurayama (JP); Takumi Ohishi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/786,929

(22) PCT Filed: Mar. 8, 2000

(86) PCT No.: PCT/JP00/01392

§ 371 (c)(1),
(2), (4) Date: Mar. 12, 2001

(87) PCT Pub. No.: WO01/67689

PCT Pub. Date: Sep. 13, 2001

(51) Int. Cl.
*G06F 15/16* (2006.01)
*H04J 3/24* (2006.01)

(52) U.S. Cl. ..................... 709/245; 709/227; 370/912
(58) Field of Classification Search ................ 709/227, 709/245; 370/912
See application file for complete search history.

(56) References Cited

U.S. PATENT DOCUMENTS

| 6,147,986 | A  | * | 11/2000 | Orsic ......................... 370/349 |
| 6,427,170 | B1 | * | 7/2002  | Sitaraman et al. .......... 709/226 |
| 6,513,061 | B1 | * | 1/2003  | Ebata et al. ................ 709/228 |
| 6,614,774 | B1 | * | 9/2003  | Wang ......................... 370/338 |
| 6,731,621 | B1 | * | 5/2004  | Mizutani et al. ............ 370/338 |

FOREIGN PATENT DOCUMENTS

JP            11-55317         2/1999

OTHER PUBLICATIONS

"Wireless Internet Access Using Anonymous Access Methods", Mobile Multimedia Communications, 1999, P. Jokela, pp. 194-197.
"Design and Implementation of v6VIP", K. Shitama, pp. 485-492.
"A Mobile IP Scheme Considering Packet Transmission Efficiency", T. Zeng, Technical Report of IEICE, SSE98-237, pp. 155-160.
"Proposed scheme for route optimization on the Mobile IP network", H. Ohnishi et al, Technical Report of IEICE, SSE99-123, pp. 7-12.

(Continued)

*Primary Examiner*—Khanh Dinh
*Assistant Examiner*—Hassan Phillips
(74) *Attorney, Agent, or Firm*—Mattingly, Stanger,Malur & Brundidge, P.C.

(57) ABSTRACT

The present invention relates to a mobile packet communication apparatus for supplying a terminating service to a mobile terminal and a packet communication control method employed for the communication network.

In the case of the conventional techniques, an original side home gateway node cannot identify a path to a destination gateway node from the original IP packet header. It is thus impossible to supply any terminating service to a dynamic IP address mobile terminal.

Under such circumstances, the present invention uses a dynamic DNS and a mobile terminal is provided with a dynamic DNS client function. When an IP address is allocated to a mobile terminal, therefore, the mobile terminal sends a DNS update message to the target subscriber node. The message includes a dynamically allocated IP address. Receiving the DNS update message, the subscriber node adds the home gateway node identifier (network identifier) of the mobile terminal to the message parameters to be sent to the dynamic DNS.

4 Claims, 14 Drawing Sheets

OTHER PUBLICATIONS

Request for Comment Dictionary, p. 745.
Layer Two Tunneling Protoocol "L2TP", RFC 2661.
Dynamic Updates in the Domain Name System (DNS Update), RFC 2136.

* cited by examiner

FIG. 4

200 RESOURCE RECORD TABLE

| FQDN | IP ADDRESS | NETWORK ID | EXPIRATION TIME | |
|---|---|---|---|---|
| p.p.q.q | 133.144.12.34 | xxx | 2005/11/22/04:32 | ← 200-1 |
| bbb.ppp.co.jp | a.b.e.f | yyy | 2005/10/12/12:15 | ← 200-2 |
| ⋮ | ⋮ | ⋮ | ⋮ | ← 200-n |

Columns: 201, 202, 203, 204

FIG. 5

600 SUBSCRIBER INFORMATION TABLE

| IMSI | LOCATION INFORMATION | SUBSCRIBER CLASS | NETWORK ID | AUTHENTICATION INFORMATION | |
|---|---|---|---|---|---|
| 0123456789 | α | 1 | xxx | aaa | ← 600-1 |
| 0112345678 | β | 2 | xxy | bbb | ← 600-2 |
| ⋮ | ⋮ | ⋮ | ⋮ | ⋮ | ← 600-n |

Columns: 601, 602, 603, 604, 605

FIG. 6

300 GATEWAY NODE ADDRESS TABLE

| NETWORK ID | GATEWAY NODE IP ADDRESS | |
|---|---|---|
| xxx | a.b.c.d | ← 300-1 |
| xxy | g.g.h.i | ← 300-2 |
| ⋮ | ⋮ | ← 300-n |

Columns: 301, 302

FIG. 7

310 USER MANAGEMENT TABLE

| IMSI | IP ADDRESS | DYNAMIC IP ALLOCATION FLAG | SUBJECT NODE IP ADDRESS | T ID | |
|---|---|---|---|---|---|
| 0123456789 | 133.144.12.34 | 0 | s.s.t.u | 12 | ← 310-1 |
| 0112345678 | — | 1 | — | — | ← 310-2 |
| ⋮ | ⋮ | ⋮ | ⋮ | ⋮ | ← 310-n |

Columns: 311 IMSI, 312 IP ADDRESS, 313 DYNAMIC IP ALLOCATION FLAG, 314 SUBJECT NODE IP ADDRESS, 315 T ID

FIG. 8

400 USER STATE MANAGEMENT TABLE

| IMSI | ORIGINATION FQDN | SOURCE IP ADDRESS | ORIGINATION NID | DESTINATION IP ADDRESS | DESTINATION NID | GATEWAY NODE IP ADDRESS | T ID | |
|---|---|---|---|---|---|---|---|---|
| 0123456789 | p.p.q.q | 133.144.12.34 | xxx | 133.144.79.97 | xxy | a.b.c.d | 12 | ← 400-1 |
| 0112345678 | p.q.s.q | — | — | — | — | — | — | ← 400-2 |
| ⋮ | ⋮ | ⋮ | ⋮ | ⋮ | ⋮ | ⋮ | ⋮ | ← 400-n |

Columns: 401 IMSI, 402 ORIGINATION FQDN, 403 SOURCE IP ADDRESS, 404 ORIGINATION NID, 405 DESTINATION IP ADDRESS, 406 DESTINATION NID, 407 GATEWAY NODE IP ADDRESS, 408 T ID

PACKET COMMUNICATION CONTROL DEVICE AND PACKET COMMUNICATION CONTROL METHOD

FIELD OF THE INVENTION

The present invention relates to a packet communication system that supplies a terminating service to each terminal to which a dynamic IP address is allocated and a packet communication control method to be employed for the system. More particularly, the present invention relates to a mobile packet communication apparatus that supplies the terminating service to each mobile terminal and a packet communication control method used in a communication network employed for the apparatus.

BACKGROUND ART

In recent years, Internet and mobile communication services have been spreading rapidly. Internet communication is realized by sending IP packets with use of the IP (Internet Protocol) (RFC 791), which is actually the standard of the communications via the Internet. In the case of such the Internet communication, each apparatus connected to the Internet is required to have an IP address decided uniquely in the world so as to be distinguished from others. The Internet decides the route for each IP packet according to the IP address.

However, general users of the Internet use their names (FQDN (Fully-Qualified Domain Name)) so as to specify destinations without knowing it. The DNS (Domain Name System) is used on the Internet. In the DNS are registered both IP address and name of the apparatus connected to the Internet. When an Internet user specifies a destination apparatus with the name, the DNS can search the IP address corresponding to the name. The DNS is a distributed data base. In case a DNS cannot reply to a query from a terminal, it puts a query to another DNS about the matter.

The IPv4 addresses used at present are expected to be used up soon as a result of such the rapid spreading of the Internet. In order to solve this problem, therefore, it is now under examination to employ a new system of IPv6 addresses. FIG. 19 shows such the IPv6 address system regulated by the RFC 2460. An IPv6 address 700 takes a three-layer structure (Public Topology 707, Site Topology 708, and Interface ID 706). The Public Topology 707 identifies a provider for relaying the Internet traffic and it is configured by a format prefix 701, a TLA ID 702 for denoting the top hierarchical layer of the routing, a reserved area 703, and an NLA ID 704 for denoting the second hierarchical layer of the routing. The Site Topology 708 identifies a sub-network in an end-user site connected to the Internet and it includes an SLA ID 705. The Internet ID 706 identifies the interface on the sub-network. When a terminal is connected to the Internet while the IPv6 IP address autoconfiguration function is used, the terminal can receive both Public Topology 707 and Site Topology 708 from the Internet, so that the terminal can combine them with an Interface ID and generate an IP address. Because the address autoconfiguration function can be used for the IPv6 addresses such way, the IPv6 address system can make it convenient to specify a destination apparatus with its name more than when it is specified with its IP address. This is why a destination apparatus should rather be specified with its name in the case of the IPv6 address system.

Because the IP address corresponding to an apparatus name is changed every moment, employment of another method is now under examination in the IETF (Internet Engineering Task Force); the method updates the DNS information dynamically (dynamic DNS). Concretely, the IETF RFC 2136 regulates the specifications of the message for updating the DNS dynamically.

On the other hand, the rate of data communication to the whole communication is getting larger and larger in mobile communication services in recent years. In order to improve the efficiency of such data communications, it is now under examination to employ such mobile packet communication networks as the PDC-P (PDC-Packet), the GPRS (General Packet Radio Service). While there are many communication protocols used for such mobile packet communication networks, the IP is the main stream of those protocols now. Generally, a mobile communication network is configured by a wireless access network consisting of base stations and base station controllers, and a core network consisting of subscriber nodes and gateway nodes. A mobile packet communication network formed on the basis of the GPRS method uses the signaling procedure specific to the GPRS just like the telephone communication so as to set a connection from an origination terminal to a gateway node of the home network before starting the packet communication. When the IP packet is sent from the origination mobile terminal to the destination mobile that uses a permanent IP address, a header addressed to the gateway node of the home network is added (encapsulation) to the IP packet in the subscriber node. The IP packet is then sent to the gateway node existing in the home of the origination terminal. In this case, the home gateway node is decided when the subscriber contract is made. Hereinafter, the gateway node is fixed. In this home gateway node, the added header is removed (decapsulation), thereby the original IP packet is restored. The home gateway node of the destination mobile terminal is identified by the IP address of the destination mobile terminal written in the destination address field of the original IP packet header. The IP packet is thus transferred to the node. The destination gateway node identifies the visiting subscriber node from the IP address set in the IP packet header, then encapsulates the IP packet again and sends it to the visiting subscriber node. The visiting subscriber node decapsulates the IP packet so as to restore the original IP packet and transfer the packet to the destination mobile terminal such way. Each IP packet thus arrives in the destination mobile terminal. A communication section in which an IP packet is decapsulated to the original one after an IP packet is capsulated is usually referred to as a tunnel.

In a mobile communication network, an IP address is allocated in two ways; in one way, an IP address is allocated to each mobile terminal permanently (hereinafter, to be referred to the permanent IP address method) and in the other way, an IP address is allocated to each mobile terminal when the mobile terminal begins communication so as to make the use of the IP address effective (hereinafter, to be referred to as the dynamic IP address method). An IP address allocated to a mobile terminal has the same format as that of the node to be connected to the mobile terminal permanently as usually. Although IPv6 addresses will be allocated to mobile terminals in the future, terminals that use such IPv6 addresses generally will not have permanent IP addresses. Consequently, a terminating service supplied to the mobile terminals that use dynamic IP addresses will become an indispensable function for mobile packet communication networks.

In the present IPv4 address system, almost all the user terminals have dynamic IP addresses allocated from each ISP (Internet Service Provider) when they begin communication respectively. However, to begin communication between terminals that use dynamic IP addresses, the packet network is required to have a directory service server and each terminal to have an application program for using the directory service.

On the other hand, the IETF is now examining the mobile IP specifications corresponding to the IPv6 address system. In the case of the mobile IPv6 address system, an origination terminal sends a packet addressed to a destination mobile terminal to the home address thereof, allocated by the provider. The home agent of the destination mobile terminal then receives the packet sent to the home address. Then, the home agent adds a header including the visiting address of the destination mobile terminal to the received packet, then transfers the packet to the destination mobile terminal. Receiving the packet, the destination mobile terminal sends a control signal to the origination terminal. The control signal includes the visiting address of the destination mobile terminal itself. The origination terminal then stores the visiting address information of the destination mobile terminal included in the control signal, thereby the visiting address of the destination mobile terminal can be used for the subsequent packet communications between those terminals. The visiting address mentioned above means an address allocated dynamically to a mobile terminal in the visiting network of the mobile terminal.

DISCLOSURE OF THE INVENTION

In the future, forms of services in each mobile packet communication network will be more diversified into, for example, communication services between mobile terminals on a mobile packet communication network, communication services from terminals on a fixed network to mobile terminals on a mobile packet communication network, etc. Communication services will also be realized between fixed terminals to which dynamic IP addresses are allocated in the fixed Internet.

In order to provide such the services, each network should be provided with a function for transferring packets to destination terminals that use dynamic IP addresses.

However, the main object of the present mobile packet communication network is to provide services with which a network carrier enables each mobile terminal to access apparatuses on a fixed network. Consequently, a packet terminating service is just supplied to mobile terminals to which fixed IP addresses are allocated.

Furthermore, according to the above conventional technique, it is possible to identify the home gateway node of a destination mobile terminal that uses a fixed IP address from the address information set in the original IP packet at the origination home gateway node. In case the destination terminal uses a dynamic IP address, however, the origination gateway node cannot identify the route to the destination gateway node from the original IP packet header. The conventional technique therefore comes to be confronted with a problem; no terminating service is provided in communications from origination terminals to mobile terminals that use dynamic IP addresses.

On the other hand, inter-terminal packet communications can use IP addresses (care of address) allocated dynamically in a visiting network as IP header information after the visiting address of the destination mobile terminal is registered in the origination terminal with use of the mobile IPv6 address method that is now examined in the IETF. In this case, the mobile terminal is required to have a fixed IP address (home address) as its identification information. The first packet addressed to a mobile terminal must be sent to the fixed IP address of the mobile terminal. In order to register a visiting address (care of address) of the destination terminal in the origination terminal, every terminal that communicates with a mobile terminal must be provided with an additional function for interpreting mobile IPv6 messages. A mobile terminal, when it is in an environment that cannot use mobile IPv6 addresses, cannot use any terminating service with use of its IP address (care of address) allocated dynamically in the visiting network.

In order to solve the above conventional problems, the mobile packet communication network of the present invention employs the dynamic DNS. Each mobile terminal is provided with a dynamic DNS client function. When an IP address is allocated to a mobile terminal, the mobile terminal sends a DNS update message including an IP address allocated thereto dynamically to the subscriber node. Receiving the DNS update message, the subscriber node adds the home gateway node ID (network ID) of the above mobile terminal to the message as a parameter and sends the message to the dynamic DNS.

The mobile terminal may not be provided with the DNS function. Instead of the function, the subscriber node may be provided with the DNS proxy function in this case. In case the subscriber node is provided with the DNS proxy function, the subscriber node sends a DNS update message including a dynamically-allocated IP address and a network ID to the dynamic DNS. In this case, the subscriber node may send a plurality of DNS update messages to the dynamic DNS at a time.

The message specifications regulated by the IETF RFC 2136 may be expanded and used for the DNS update message to be sent to the dynamic DNS. The present invention enables the subscriber node to add a network ID parameter to the DNS update message. A network ID is an ID of a gateway node through which packets are always sent from the subject mobile terminal. Receiving a DNS update message as described above, the dynamic DNS updates both IP address and network ID corresponding to the apparatus name.

The origination terminal starts up the communication registration procedure before beginning the communication with a mobile terminal, then sets a connection for transferring packets to the origination home gateway node therefrom. Receiving the communication registration procedure, the home gateway node checks whether or not an IP address is set for the origination terminal. In case the origination terminal uses the dynamic IP address method, the home gateway node allocates an IP address to the origination terminal.

Then, the origination terminal sends a DNS query message to the dynamic DNS so as to identify the IP address allocated to the destination terminal from the apparatus name. According to the present invention, the subscriber node uses a UDP port number so as to monitor the DNS message for using the UDP port 53. Receiving such a DNS message, the subscriber node refers to the operation code set in the received message so as to detect a DNS query message (Opcode=0), then waits for a reply message to be received in response to the DNS query message and stores the IP address and the network ID of the destination terminal included in the reply message temporarily.

The subscriber node, when receiving a packet addressed to a destination terminal from an origination terminal, reads the network ID of the destination terminal stored by the second means, then adds the header information addressed to the origination side home gateway node and the network ID to the user packet to be sent to the origination side home gateway node.

Receiving the user packet, the origination side home gateway node refers to the network ID of the destination terminal included in the received packet so as to identify the destination side home gateway node to which the received packet is to be transferred. Each gateway node holds a table on correspondence between the IP address and the network ID of each of mutually connectable gateway nodes and uses the table for transferring packets between gateway nodes.

A header addressed to the destination side home gateway node is added to each packet addressed to a destination terminal at the origination side home gateway node, then the packet is sent to the destination side home gateway node. The method for transferring packets between gateway nodes may use the routing table of each gateway node, as well as the L2TP (Layer Two Tunneling Protocol) (RFC 2661) examined by the IETF, the GTP (GPRS Tunneling Protocol) specified by the ETSI, and a label switching technique (Internet RFC Dictionary, p 745), for example.

The destination side home gateway node decapsulates the received packet, then identifies the visiting subscriber node of the destination terminal from the destination IP address set in the original IP header. Then, the destination side home gateway node adds a header addressed to the subscriber node again to the packet and transfers the packet to the destination terminal.

According to the present invention, therefore, it is possible to identify the home gateway siwtching system of each terminal that uses the dynamic IP address method from the network ID so as to supply the terminating service to the mobile terminals that use the dynamic IP address method.

In this case, a subscriber node that has received a dynamic DNS update request from a terminal may not send a request for updating both IP address and network ID corresponding to the apparatus name set in the dynamic DNS to the dynamic DNS; instead, the subscriber node may be provided with the dynamic DNS proxy function. Concretely, in case a terminal has an allocated IP address, the subscriber node sends a request for updating both IP address and network ID corresponding to the apparatus name set in the dynamic DNS to the dynamic DNS without receiving the dynamic DNS update request from the terminal. Consequently, it is possible to supply the terminating service to mobile terminals that use the dynamic IP address method while each terminal is not provided with the dynamic DNS client function. In addition, in case a subscriber node sends a plurality of DNS update requests to the dynamic DNS at a time, it is possible to reduce the load of the dynamic DNS to be caused by the resource record updating.

Each gateway node may monitor DNS query messages and accumulate information of both IP address and network ID included in each reply received in response to a DNS query. Consequently, it is possible to supply the terminating service to the mobile terminals that use the dynamic IP address method without changing the communication protocol used between the subscriber node and the gateway node.

Each gateway node, when receiving a packet addressed to a destination terminal, may ask the dynamic DNS about the network ID corresponding to the IP address of the destination terminal. The gateway node, when receiving the packet, obtains the network ID from the dynamic DNS and identify the destination side gateway node to which the packet is to be transferred. Consequently, it is possible to supply the terminating service to the mobile terminals that use the dynamic IP address method without providing any of subscriber nodes and gateway nodes with the DNS message monitoring function.

Furthermore, the gateway node may monitor DNS query messages and accumulate information of both IP address and network ID included in each reply to a DNS query so as to put a query to the dynamic DNS about the network ID corresponding to the IP address of a destination terminal when receiving a packet addressed to the destination terminal from an origination terminal. Consequently, it is possible to obtain the network ID of the destination terminal, thereby the terminating service can be supplied to mobile terminals that use the dynamic IP address method even when a DNS query message sent from an origination terminal does not pass the home gateway node used by the origination terminal.

BRIEF DESCRIPTION OF THE DRAWINGS

FIG. 4 is a configuration of a resource record table held by a dynamic DNS.

FIG. 5 is a configuration of a subscriber information table held by a service controller.

FIG. 6 is a configuration of a gateway node address table held by a gateway node.

FIG. 7 is a configuration of a user management table held by a gateway node.

FIG. 8 is a configuration of a user state management table held by a subscriber node.

BEST MODE FOR CARRYING OUT THE INVENTION

Hereunder, a first embodiment of the present invention will be described with reference to the accompanying drawings.

Figure 1:
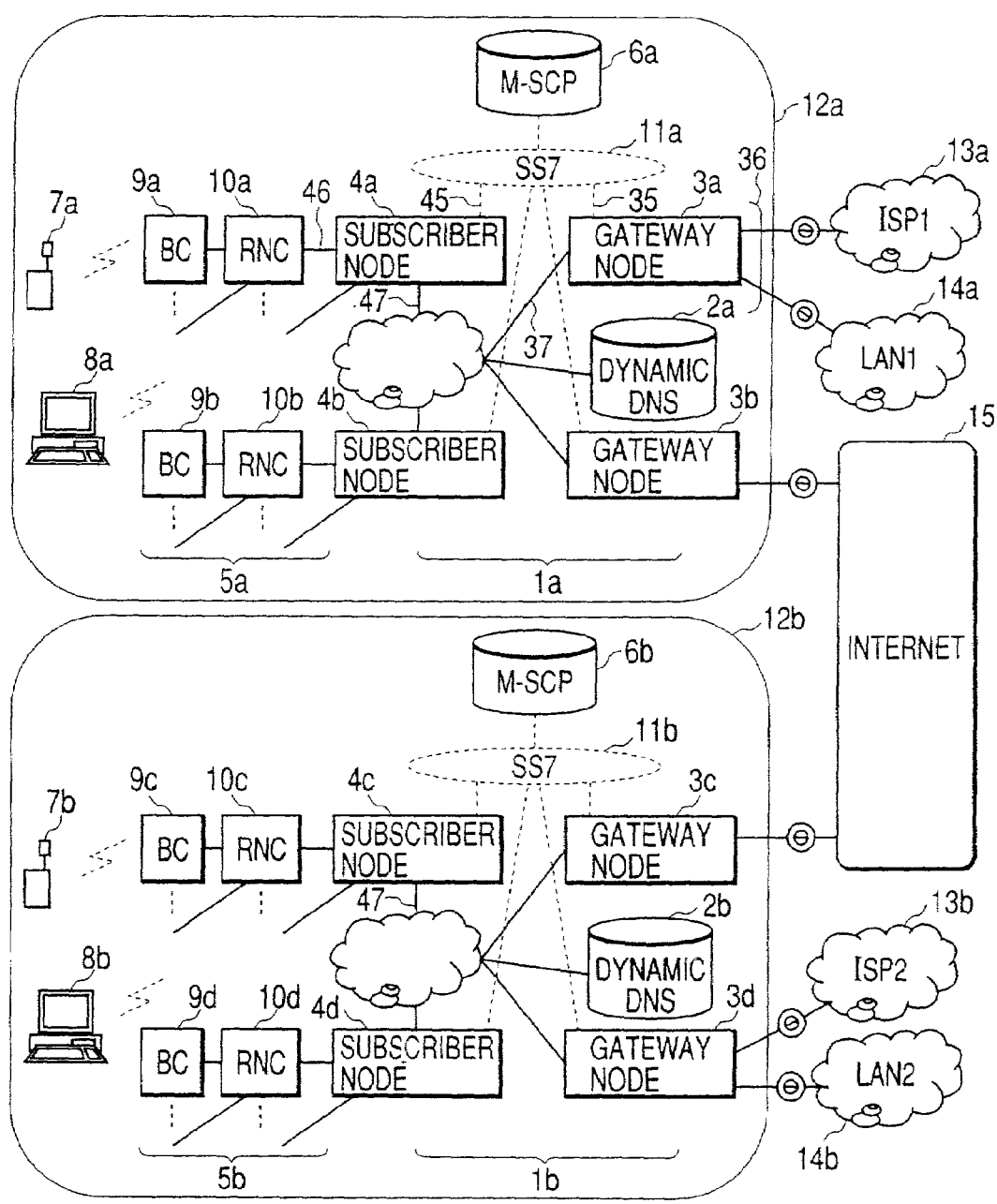
FIG. 1 is a block diagram of a mobile packet communication network.

FIG. 1 is a block diagram of a mobile packet communication network 12 (12a, 12b) in the first embodiment of the present invention.

The mobile packet communication network 12 is configured by a wireless access network 5 (5a, 5b) and a core network 1 (1a, 1b). In the case of the present invention, a dynamic DNS 2 (2a, 2b) is connected to the core network 1. The core network 1 is configured by a plurality of subscriber nodes 4 and a plurality of gateway codes 3. Those subscriber nodes 4 and those gateway codes 3 are connected to an M-SCP 6 (6a, 6b) via a common channel signalling network 11 (11a, 11b) respectively. A gateway node 3 has means for communication with networks other than the mobile packet communication network 12 with use of the Internet protocol. The communication means may be, for example, an ISP 13, a LAN 14, the Internet 15, or the like.

The wireless access network 5a is configured by a plurality of base stations (BS) 9 (9a, 9b) and a plurality of base station controllers (RNC) 10 (10a, 10b).

The dynamic DNS 2 receives a DNS update signal from the terminal 7 and/or 8 allocated with a dynamic IP address or from a subscriber node 4 provided with a dynamic DNS proxy function and updates the IP address information and the network ID corresponding to the name of the terminal.

The M-SCP 6 stores a program for supplying additional services to the subscribers and a subscriber information table 600 shown in FIG. 5.

Subscriber nodes and gateway nodes refer to the subscriber information table 600 so as to obtain contract conditions, location information, and authentication information of those subscribers. The subscriber information table is configured by a plurality of entries (600-1 to 600-n) generated for each mobile packet communication network subscriber ID (IMSI) 601 as shown in FIG. 5. Each entry corresponds to an IMSI and defines the location information 602, the subscriber class 603, the network ID 604, and the authentication information 605.

Figure 2:
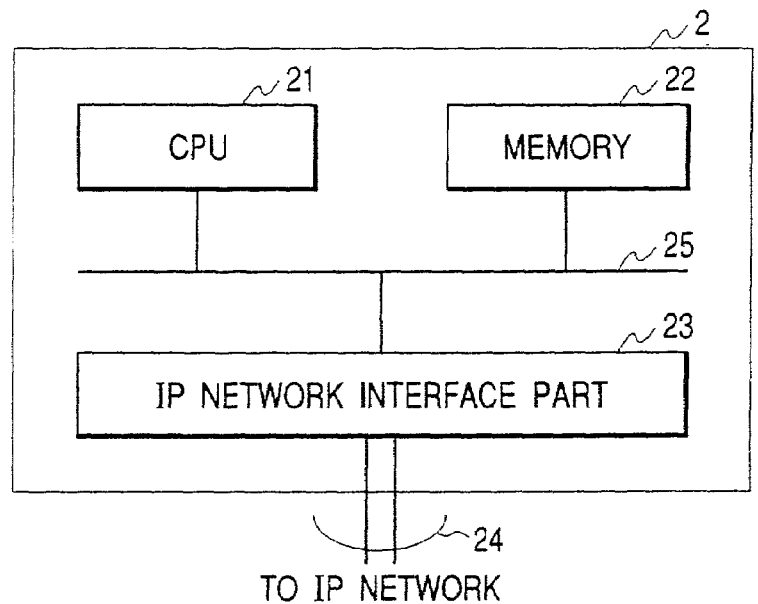
FIG. 2 is a block diagram of a dynamic DNS.

FIG. 2 is a block diagram of a dynamic DNS 2.

The dynamic DNS 2 is connected to a CPU 21 that controls the DNS query signal and the DNS update signal exchanged between apparatuses of the mobile packet communication network and between the mobile packet communication network and another IP network; a memory 22; and an IP interface part 23 that terminates the signal line connected to an IP network via a bus 25 respectively.

The communication between the CPU 21 and another apparatus of the mobile packet communication network uses, for example, the Internet protocol.

The memory 22 stores a program for sending/receiving signals to/from terminals and nodes connected to an IP network, or another DNS, as well as a resource record table 200 shown in FIG. 4.

The resource record table 200 is referred from apparatuses on a mobile packet communication network and other IP networks so as to identify the IP addresses corresponding to their names. The resource record table 200 is configured by a plurality of entries (200-1 to 200-n) generated for each FQDN (name) 201 as shown in FIG. 4. Corresponding to the FQDN 201, each entry defines the IP address 202, the network ID 203, and the expire date 204.

The IP address 202, when it is allocated to a terminal, is updated by a request issued from the terminal or subscriber node 4 provided with the dynamic DNS proxy function. An apparatus that has allocated an IP address to a terminal may also request the dynamic DNS 2 to update the IP address.

The network ID 203, when a terminal uses the dynamic IP address method, is updated together with the IP address information.

The dynamic DNS resource record table of the present invention differs from other ordinary resource record tables in that the table 200 stores a network ID for each terminal name.

Figure 3:
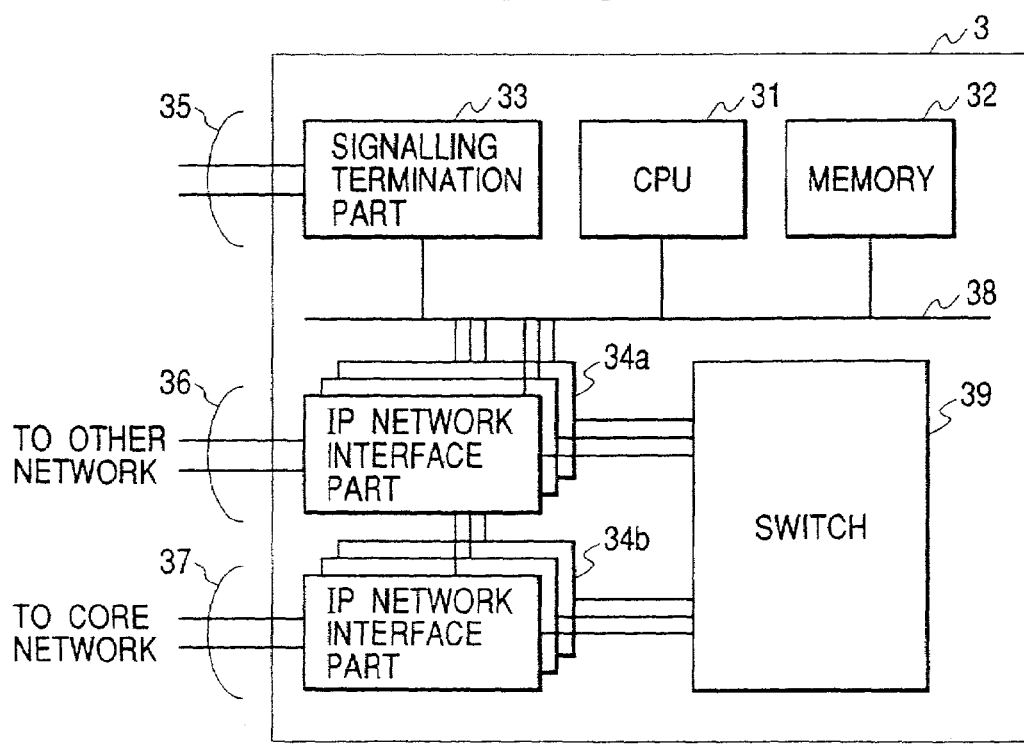
FIG. 3 is a block diagram of a gateway node/subscriber node.

FIG. 3 is a block diagram of a gateway node 3 or subscriber node 4.

The gateway node 3 is configured by a CPU 31 for controlling signals sent/received to/from subscriber nodes and other networks; a memory 32; a signaling termination part 33 for terminating signal lines connected to a common channel signalling network 35; and an IP network interface part 34 (34a, 34b) for terminating signal lines 36 connected to other IP networks and signal lines 37 connected to other nodes in a core network 1 via a bus 38 respectively.

The communication between the CPU 31 and a subscriber node/another network uses, for example, the Internet protocol.

The memory 32 stores a program for sending/receiving signals to/from apparatuses on another IP network or apparatuses on the core network 1, a program for allocating an IP address to a terminal dynamically, a gateway node address table 300 shown in FIG. 6, and a user management table 310 shown in FIG. 7.

The IP address assignment may be realized by such a stand-alone apparatus as a DHCP (Dynamic Host Configuration Protocol) server, or the like.

The IP network interface part 34 is connected to a switch 39 used to switch the connection in the node 3.

The gateway node address table 300 is referred so as to identify the IP address of another gateway node corresponding to a network ID. The table 300 defines a relationship between the network ID entry 301 and the gateway IP address entry 302.

The user management table 310 is configured by a plurality of entries generated for each subscriber ID of a mobile packet communication network (IMSI) 311 as shown in FIG. 7. Corresponding to the IMSI 311, each entry defines items of the IP address 312; the dynamic IP address flag 313 for denoting that the IP address allocation method is dynamic; the subscriber node IP address 314 at which the current terminal exists; a tunnel ID 315 for identifying a connection set between a subscriber node and a home gateway node.

When the apparatus shown in FIG. 3 is employed as a subscriber node 4, the configuration of the subscriber node 4 becomes the same as that of the gateway node except that the signalling termination part 33 terminates the signal lines 45 connected to the common channel signalling network and the IP network interface part 34 terminates the signal line 46 connected to the wireless access network 5 and the signal line 47 connected to other nodes in the core network.

The communication between the CPU 31 and apparatuses in another core network or apparatuses on the wireless access network uses, for example, the Internet protocol.

Figure 11:
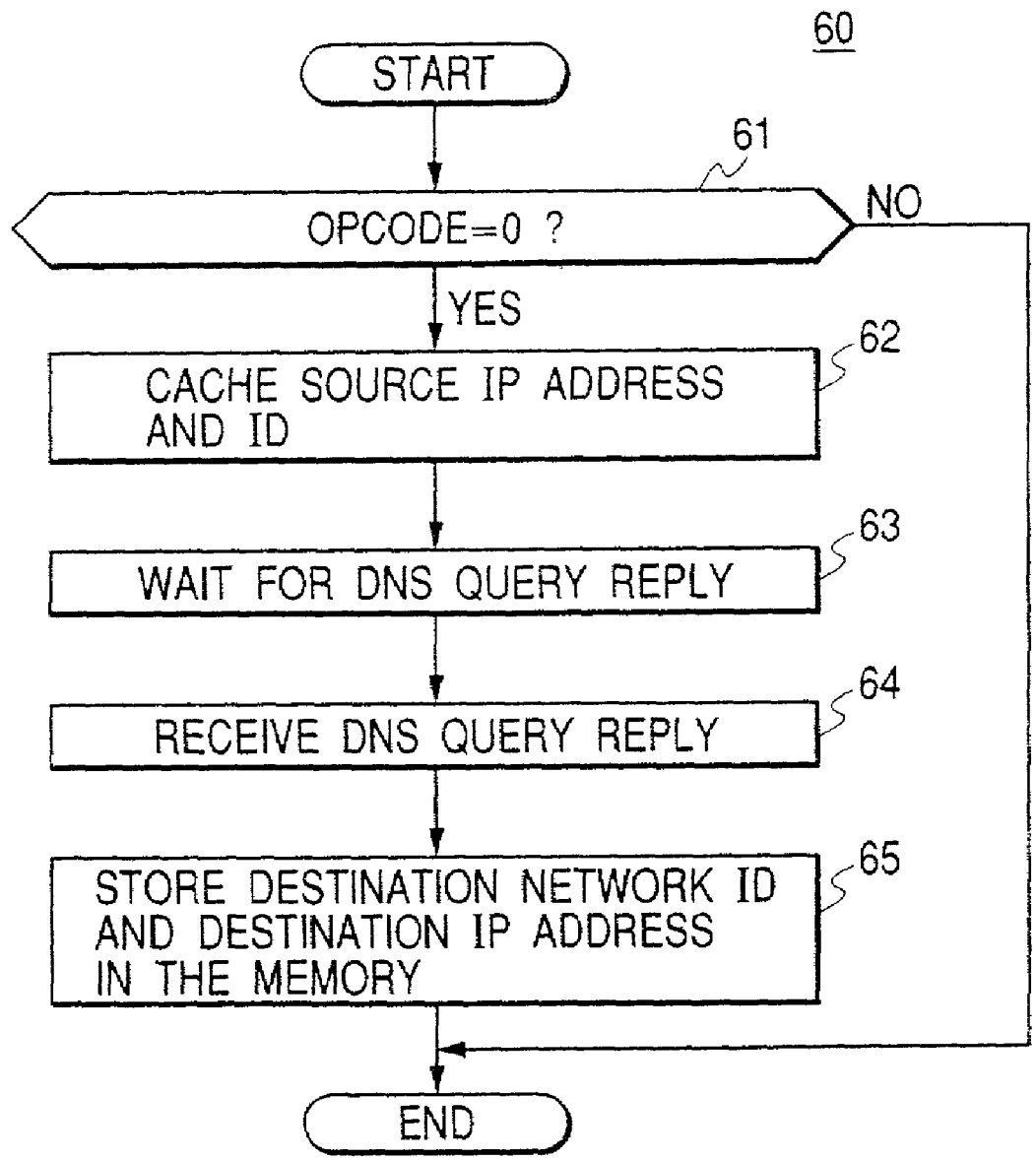
FIG. 11 is a flowchart for describing processings to be executed at a subscriber node/gateway node.

The memory 32 stores a program for sending/receiving signals to/from apparatuses on the wireless access network or apparatuses on another core network, a program for monitoring TCP/UCP port numbers, a program for monitoring queries to the dynamic DNS shown in FIG. 11, and a user state management table 400 shown in FIG. 8.

The user state management table 400 is configured by a plurality of entries (400-1 to 400-n) generated for each mobile packet communication network subscriber ID (IMSI) 401 as shown in FIG. 8. Corresponding to the IMSI 401, each entry defines items of the origination terminal FQDN 402, the origination terminal IP address 403, the origination terminal network ID 404, the destination terminal IP address 405 obtained by the DNS query monitoring program shown in FIG. 11, the destination terminal network ID 406, the source subscriber home gateway node IP address 407, the tunnel ID 408 for identifying a connection between a subscriber node and a home gateway node.

Figure 9:
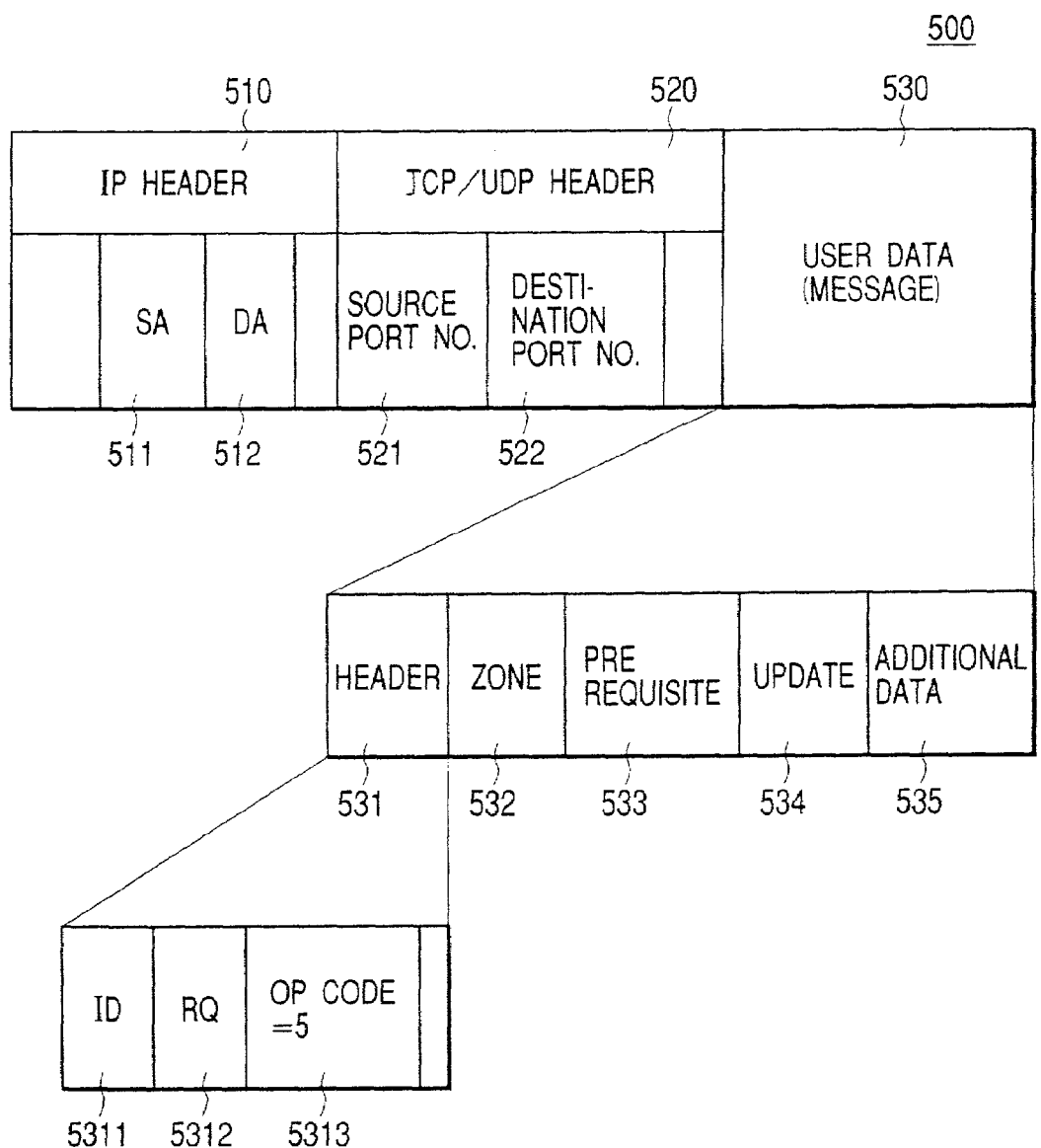
FIG. 9 is a format of the DNS update message to be received by a dynamic DNS.

FIG. 9 shows a format of IP packets to be sent between the terminal 7 or 8 and the dynamic DNS so as to change a resource record corresponding to the FQDN of the dynamic DNS. When a terminal is not provided with the dynamic DNS client function while a subscriber node 4 is provided with the dynamic DNS proxy function, the packet shown in FIG. 9 is sent between the subscriber node 4 and the dynamic DNS 2.

The IP packet 500 is configured by an IP header 510, a TCP/UDP header 520, and a user data field 530. A control message for updating the DNS is set in the user data field 530.

When an apparatus on an IP network communicates with the dynamic DNS 2, "53" is set as the destination port number of the TCP/UDP header 520.

The control message for "updating the DNS" sent from a subscriber node 4 to the dynamic DNS 2 is configured by sections of Header 531 including ID 5311 for identifying a request source, RQ 5312 for denoting a message request/reply, and OP code 5313 for denoting a message type; Zone 532 for denoting zone information to be updated; Prerequisite 533 including information of the current state of the target zone; Update 534 for denoting an item to be updated; and Additional Data 535 including information related to the updating zone. The OP code of the "DNS Update" is "5".

Figure 10:
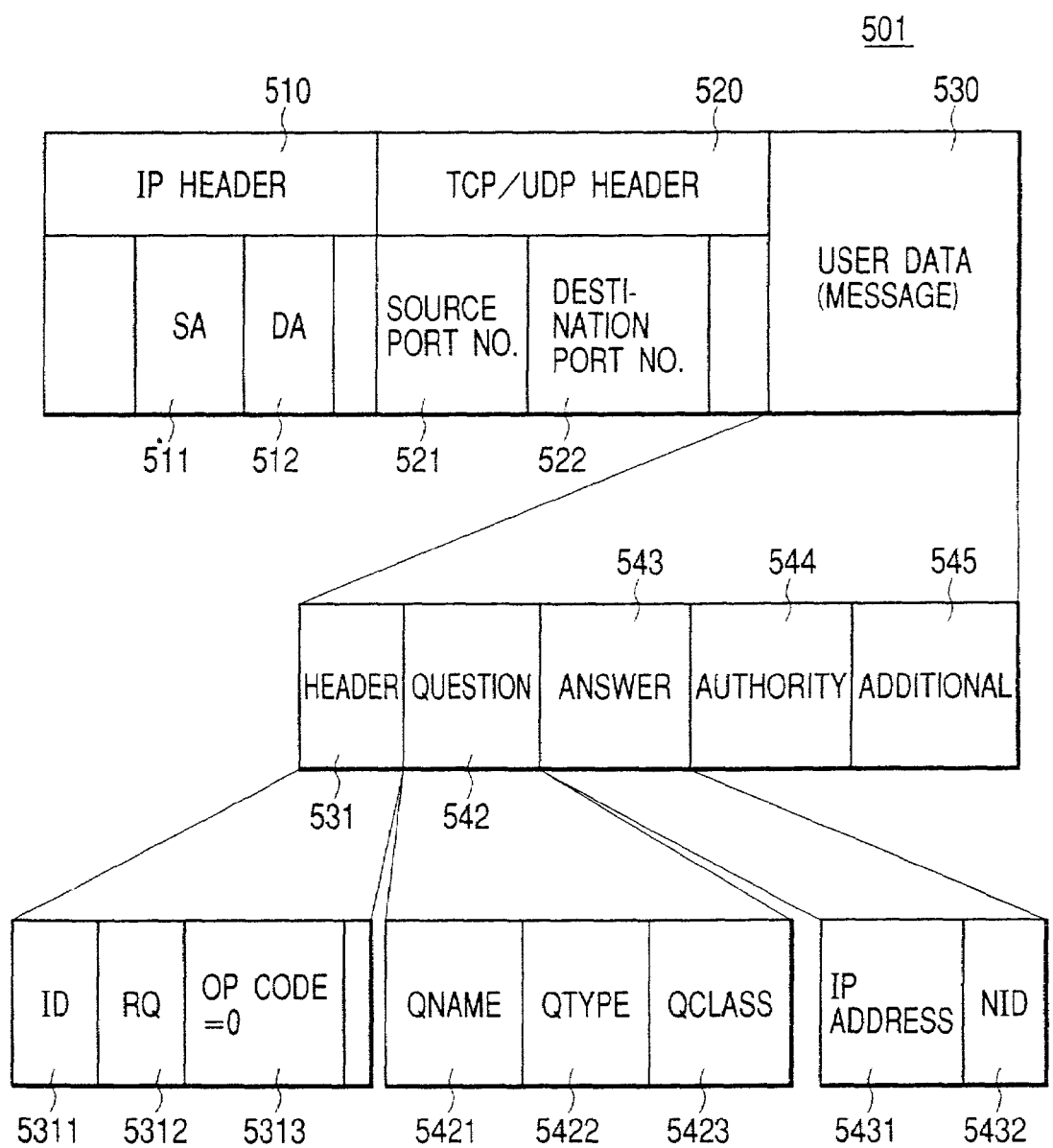
FIG. 10 is a format of the DNS query message to be received by a dynamic DNS.

FIG. 10 shows a format of IP packets to be sent between the terminal 7 or 8 and the dynamic DNS 2 so as to query a resource record corresponding to the domain name of the dynamic DNS.

The configuration of the IP packet and the configuration of the header 531 in a control message for putting a query to the DNS are the same as those shown in FIG. 9. The OP code of the "DNS query" is "0".

The "DNS query" to be sent from a terminal to the dynamic DNS 2 includes Header 531, which is followed by Question 542 including items queried to the dynamic DNS 2; Answer 543 including a reply to a query; Authority 544 including pointer information to Authoritative Name Server; Additional 545 including information related to the reply.

The question session 542 includes a query type (QTYPE) 5422, a query class (QCLASS) 5423, and a query domain name (QNAME) 5421.

The answer session 543 includes a resource record related to a query. For example, an IP address 5431 and a network ID (NID) 5432 corresponding to a terminal name are included.

FIG. 11 shows a DNS query monitoring routine 60 started up when the subscriber node 4 detects a TCP/UCP port "53".

The DNS query monitoring routine 60, when a port number 53 is detected, reads the value of the OP code 5313 included in the header 531 of a control message (step 61). When the OP code is "0", the routine 60 stores the source IP address 511 of the IP header 510 and the ID 5311 for identifying the request source temporarily (step 62), then waits for a reply to be received in response to the DNS query (step 63).

When the subscriber node 4 receives a reply message in response to a DNS query including the value stored in step 62 (step 64), the routine 60 adds the destination IP address and the destination network ID included in the answer session 543 of the reply message returned to the DNS query in the field corresponding to the source IP address of the user state management table 400 stored in the memory (step 65). The routine 60 is then terminated.

In case the OP code is not "0" in step 61, the routine 60 is terminated with no operation.

Figure 12:
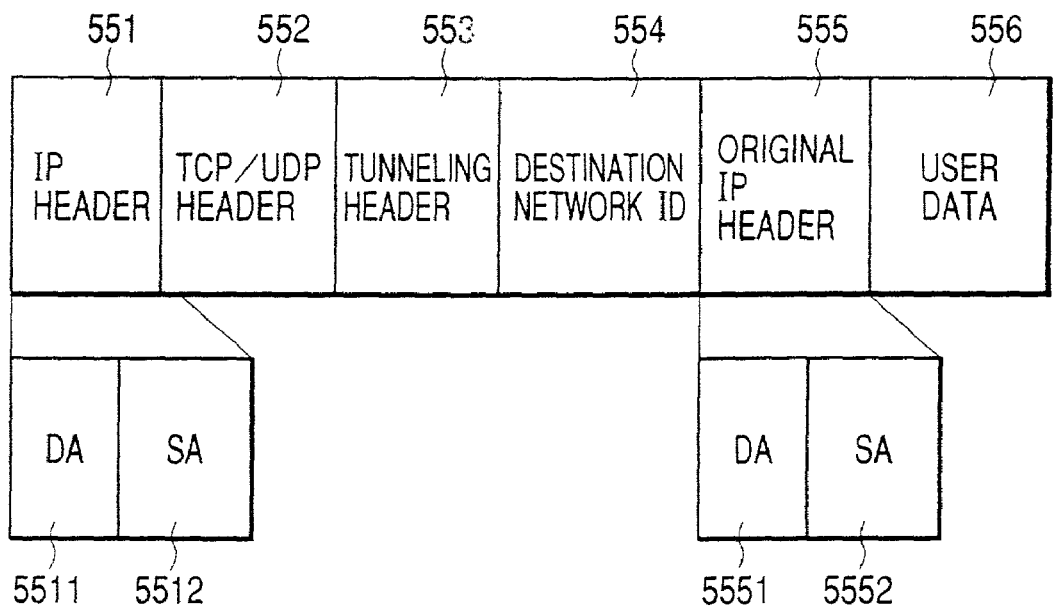
FIG. 12 is a format of packets to be transferred between a subscriber node and a gateway node.

FIG. 12 shows a format of the packet 550 to be transferred through a connection between the subscriber node 4 and the gateway node 3.

The packet 550 is configured by items of IP Header 551; TCP/UCP Header 552; Tunnel Header 553; Destination Network ID 554; Original IP Header 555; and Original User Data 556.

When a packet is transferred from a subscriber node to a gateway node, the IP address of the subscriber node 4 is set in the source IP address 5512 of the IP header 551 and the IP address of the gateway node 3 is set in the destination IP address 5511 respectively.

Header information for each encapsulation method is set in the tunnel header 553.

When a packet is transferred from a subscriber node to a gateway node, the destination network ID corresponding to the destination IP address 5551 set in the original IP header 555 is read from the user state management table 400 and it is set in the destination network ID 554.

Figure 13:
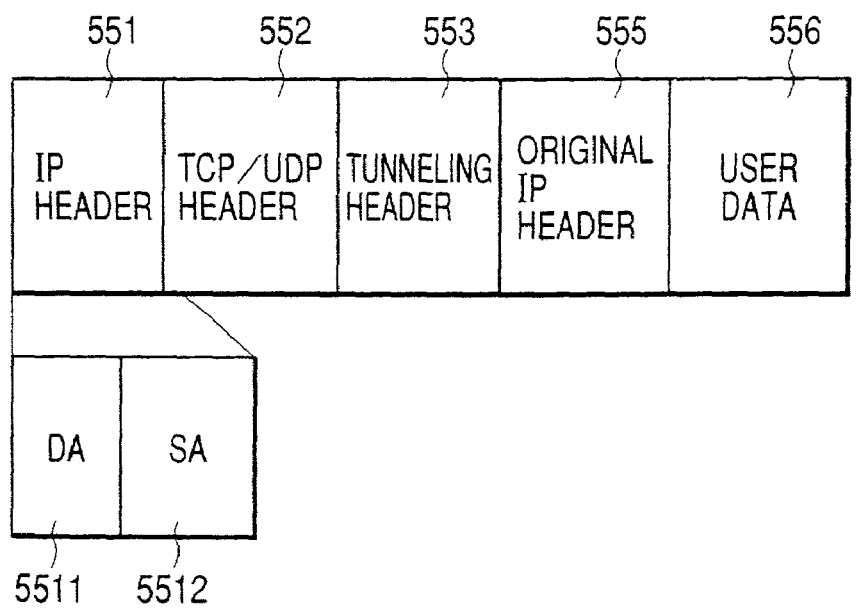
FIG. 13 is a format of packets to be transferred between gateway nodes.

FIG. 13 shows a format of the packet 560 to be transferred via a connection set between gateway nodes 3.

Whether or not the destination network ID 554 is included is only a difference between the above packet 560 and the packet 550 shown in FIG. 12.

When a packet is transferred from an origination gateway node to a destination gateway node, the IP address corresponding to the destination network ID is read from the gateway node address table 300 and it is set in the destination IP address 5511 set in the IP header 551.

Next, a description will be made for the origination procedure and the communication procedure carried out respectively in the mobile packet communication network shown in FIG. 1 with reference to the signal sequences shown in FIGS. 14 through 16.

Figure 14:
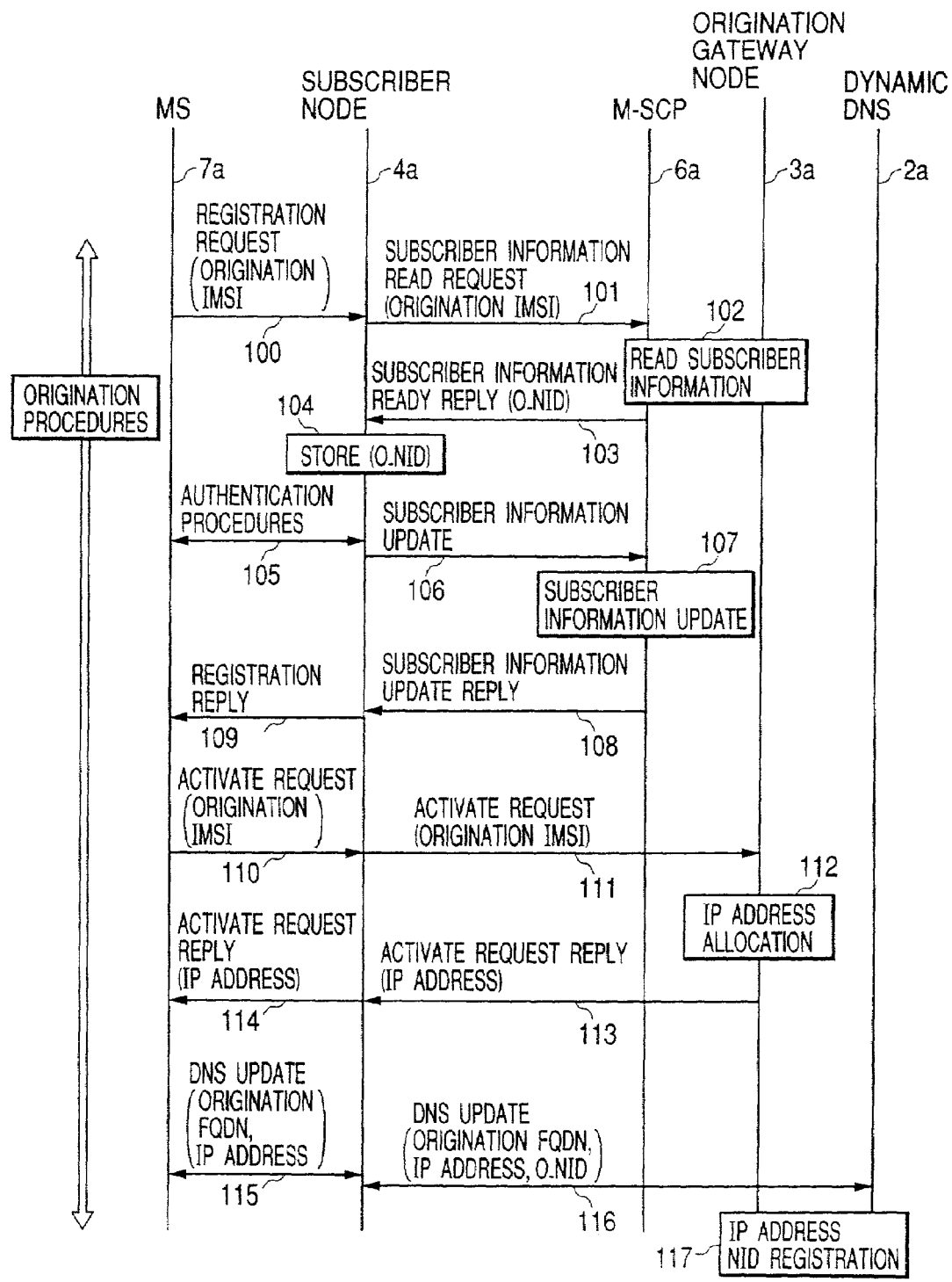
FIG. 14 is a flowchart for describing the originating procedure of terminals.

FIG. 14 shows the origination procedure required for the user of the mobile terminal 7a connected to the mobile packet communication network 12a to start packet communication.

The mobile terminal 7a must register itself in the subject network before starting the packet communication. At first, the mobile terminal 7a sends a communication registration request message 100 to the subscriber node 4a. The message 100 includes a mobile packet communication network subscriber ID (IMSI). Receiving the communication registration request message 100, the subscriber node 4a decides the M-SCP 6a for holding the subscriber information according to the IMSI included in the received message 100 and sends the subscriber information read request message 101 to the M-SCP 6a.

Receiving the subscriber information read request message 101, the M-SCP 6a reads the authorization information and the network ID from the subscriber information table 600 according to the IMSI included in the received message 101 (step 102) and sends the subscriber information read reply message 103 including the authorization information and the network ID to the subscriber node 4a.

Receiving the reply message 103, the subscriber node 4a writes the network ID included in the received message 103 in the field corresponding to the IMSI of the user state management table 400 (step 104), then executes an authorization processing for the mobile terminal 7a (step 105).

When the authorization processing is terminated normally, the subscriber node 4a sends a subscriber information updating message 106 including the self IP address to the M-SCP 6a.

Receiving the updating message 106, the M-SCP 6a writes the subscriber node IP address included in the received message 106 in the location information field of the subscriber information table 600 (step 107), then sends a reply message 108 to the subscriber node 4a in response to the subscriber information updating message. Receiving the reply message 108, the subscriber node 4a sends a communication registration reply message 109 to the mobile terminal 7a.

Then, the mobile terminal 7a executes a processing required to send/receive packet data. The mobile terminal 7a sends an activation request message 110 including the IMSI to the subscriber node 4a so as to enable sending/receiving packet data.

The subscriber node 4a reads the network ID from the user state management table 400 in step 104. After identifying the gateway node 3a from the network ID, the subscriber node 4a sends an activation request message 111 to the gateway node 3a so as to set a connection between the subscriber node 4a and the gateway node 3a.

Receiving the activation request message 111, the gateway node 3a allocates an IP address to the mobile terminal 7a in case no IP address is allocated to the mobile terminal 7a (step 112). The gateway node 3a then sends reply messages 113 and 114 to the mobile terminal 7a via the subscriber node 4a. The reply messages 113 and 114 include the IP address allocated to the mobile terminal 7a respectively. The subscriber node 4a then writes the IP address allocated to the terminal 7a and included in the received message 113 in the subscriber state management table 400.

The automatic IP address allocation technique may use the DHCP (Dynamic Host Configuration Protocol) regulated by IETF EFC 1541 and the address autoconfiguration function of the IPv6.

Receiving the reply message 114 returned in response to the activation request, the mobile terminal 7a sends a DSN update message 115 to the subscriber node 4a. The DSN update message 115 includes the FQDN and the IP address included in the received message 114. The subscriber node 4a, when receiving the message 115, reads the network ID from the user state management table 400. The network ID is written in the table 400 in step 104. After that, the subscriber node 4a sends a DNS update message 116 to the dynamic DNS 2a. In the DNS update message 116, the Network ID is added to the received message 115 as a parameter. The dynamic DNS 2a then updates the values in both IP address field and network ID field in the resource record table 200 corresponding to the FQDN included in the received message 116 (step 117).

In case the subscriber node that has received the message 113 in response to the activation request is provided with the dynamic DNS proxy function and means for sending a request for updating both IP address and network ID corresponding to the terminal name set in the dynamic DNS to the dynamic DNS without receiving any dynamic DNS update request from a terminal when the subscriber node is provided with the dynamic DNS proxy function and an IP address is allocated to the terminal, the subscriber node may read the network ID written in the user state management table 400 in step 104 and send the network ID parameter and a DNS update message 116 including the dynamic IP address included the received message 113 to the dynamic DNS 2a.

The origination terminal network ID may be specified when the terminal sends an activation request message 110.

Figure 15:
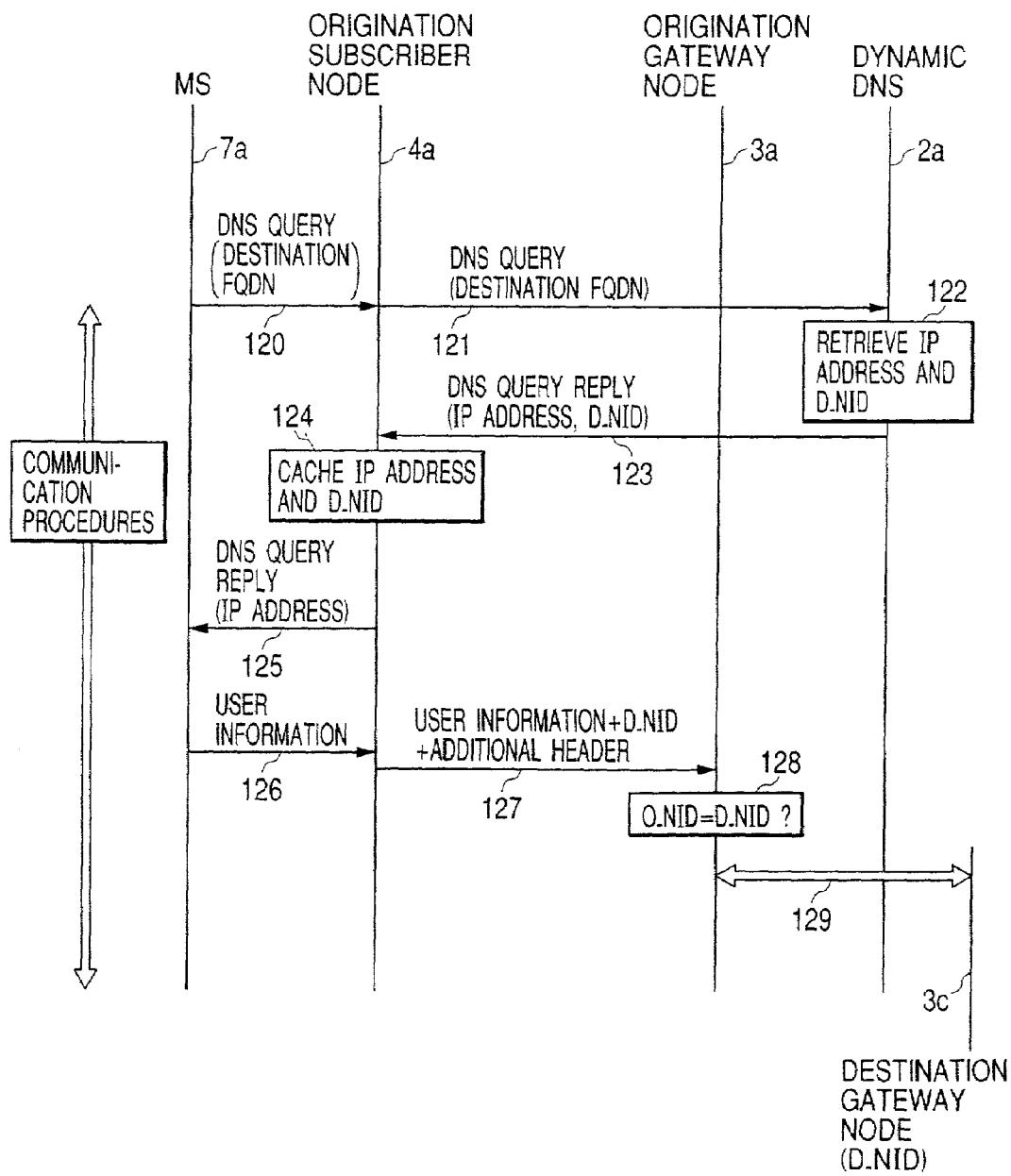
FIG. 15 is a flowchart for describing the communication procedure of origination terminals that belong to different gateway nodes respectively.

FIG. 15 shows a procedure for sending/receiving packet data to/from the mobile terminal 7a that has completed originating of a packet shown in FIG. 14.

When the user of the mobile terminal 7a specifies a destination terminal with its name, the mobile terminal 7a sends a DNS query message 120, 121 including the name (FQDN) to the dynamic DNS 2a via the subscriber node 4a so that the IP address is identified from the destination name. At this time, the subscriber node 4a detects the TCP/UCP port number 53 and starts up the DNS query monitoring routine 60 shown in FIG. 11. The subscriber node 4a, when detecting that the OP code included in the header of the control message is "0", stores the source IP address set in the IP header of the received message 120 and the ID for identifying the request source temporarily and waits for a reply message to be returned to the DNS query.

Receiving the DNS query message 121, the dynamic DNS 2a refers to the resource record table 200 so as to read both of the corresponding IP address and network ID with reference to the FQDN included in the received message 121 (step 122). In case the dynamic DNS 2a cannot reply to the query 121 by itself, the dynamic DNS 2a can put a query to the DNS server that manages upper domains about the replay, thereby obtaining both IP address and network ID corresponding to the FQDN from the DNS server that manages the domain to which the FQDN belong.

Obtaining both IP address and network ID corresponding to the FQDN, the dynamic DNS 2a sends a message 123 including the IP address and the network ID to the subscriber node 4a in response to the DNS query.

Receiving the reply message 123, the subscriber node 4a writes the IP address and the network ID included in the received message 123 in the entries (the destination IP address field and the destination network ID) corresponding to the source IP address in the user state management table 400 (step 124). Then, the subscriber node 4a sends a message including the IP address corresponding to the FQDN to the mobile terminal 7a in response to the DNS query.

The mobile terminal 7a, receiving the reply message 125, sets the IP address included in the received message 125 in the destination IP address field of the IP header and sends the IP packet including the user information to the subscriber node 4a (step 126).

The subscriber node 4a, receiving the IP packet 126, reads the destination network ID, the gateway node IP address, and the tunnel ID corresponding to the source IP address from the user state management table 400. The subscriber node 4a then adds the network ID to the user information so as to enable the packet transfer to the destination terminal. Then, the subscriber node 4a adds an additional header including the tunnel information to the user information to be transferred to the gateway node 3a via the connection between the subscriber node 4a and the gateway node 3a, set in the origination procedure. The packet is thus transferred to the gateway node 3a (step 127).

Receiving the packet 127 configured by the original user information, the destination network ID, and the header including the tunnel information, the gateway node 3a removes the additional header and compares the ID of the gateway node itself with the destination network ID included in the received packet 127 (step 128).

In case the origination and destination network IDs do not match, the gateway node 3a refers to the gateway node address table 300 so as to read the IP address of the destination gateway node 3c corresponding to the destination network ID. After that, the gateway node 3a transfers the packet configured by the original user information and the additional header including both origination and destination node IP addresses to the gateway node 3c (step 129).

Figure 16:
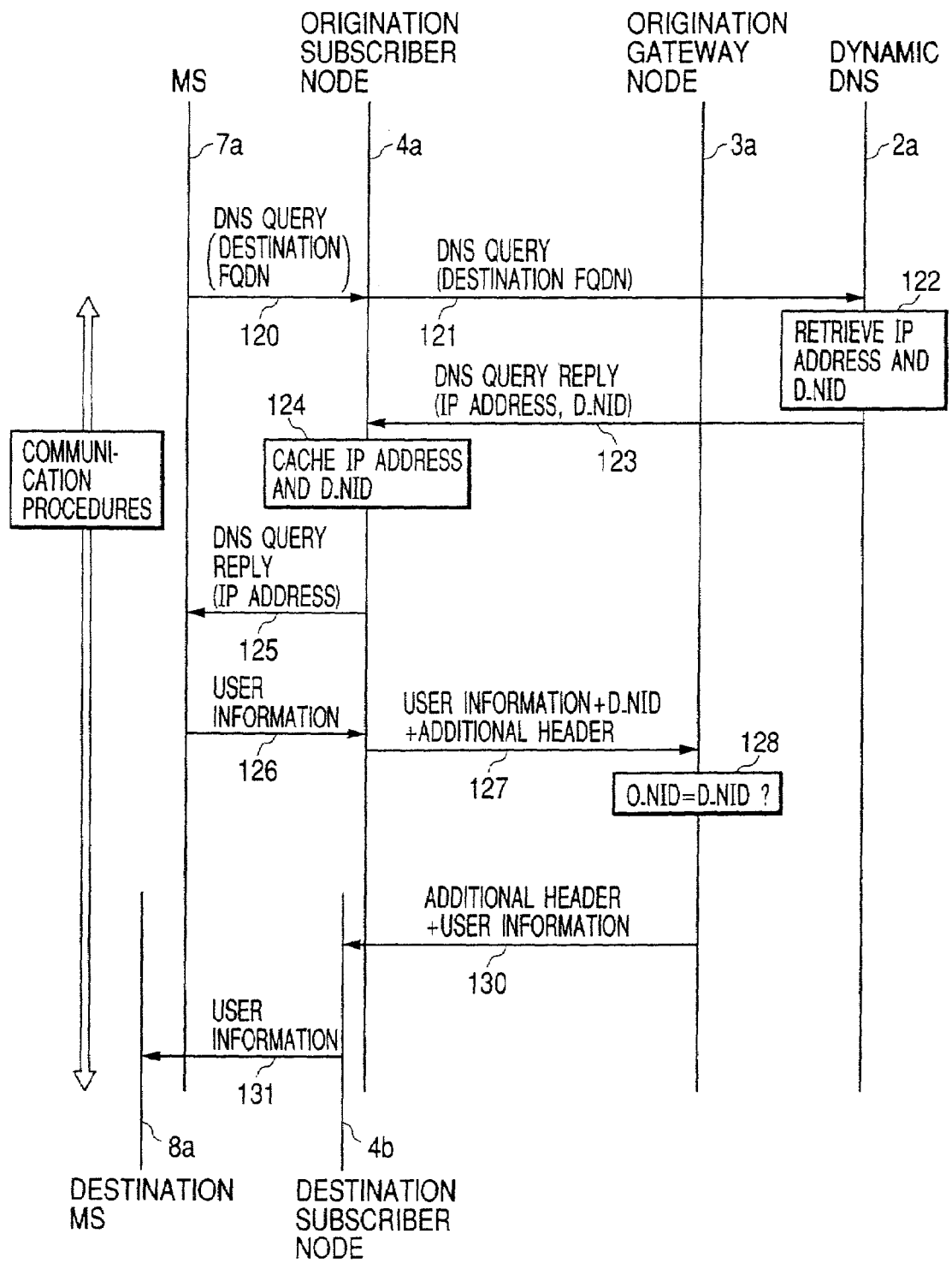
FIG. 16 is a flowchart for describing the communication procedure of origination terminals that belong to one and the same gateway node.

FIG. 16 shows a procedure carried out in step 128 shown in FIG. 15 when both origination and destination network IDs match.

The processings in steps 120 to 128 are the same as those shown in FIG. 15.

When both origination and destination network IDs match, the gateway node 3a refers to the user management table 310 according to the destination IP address included in the original user information of the received packet 127 so as to read the IP address of the visiting subscriber node of the destination terminal. The gateway node 3a then transfers the packet 130 including the additional header including the IP address of the subscriber node 4b and the self IP address, as well as the original user information to the subscriber node 4b.

Receiving the packet 130, the subscriber node 4b removes the additional header, then transfers the packet 131 including the original user information to the mobile terminal 8a.

With the above processings, a packet is transferred to a mobile terminal that has completed an origination processing in a mobile packet communication network even when the destination terminal uses the dynamic IP address method.

Next, a second embodiment of the present invention will be described with reference to the accompanying drawings. In this embodiment, the gateway node 3 is provided with the DNS query monitoring routine 60 shown in FIG. 11; the subscriber node 4 is not provided with the routine 60.

Figure 17:
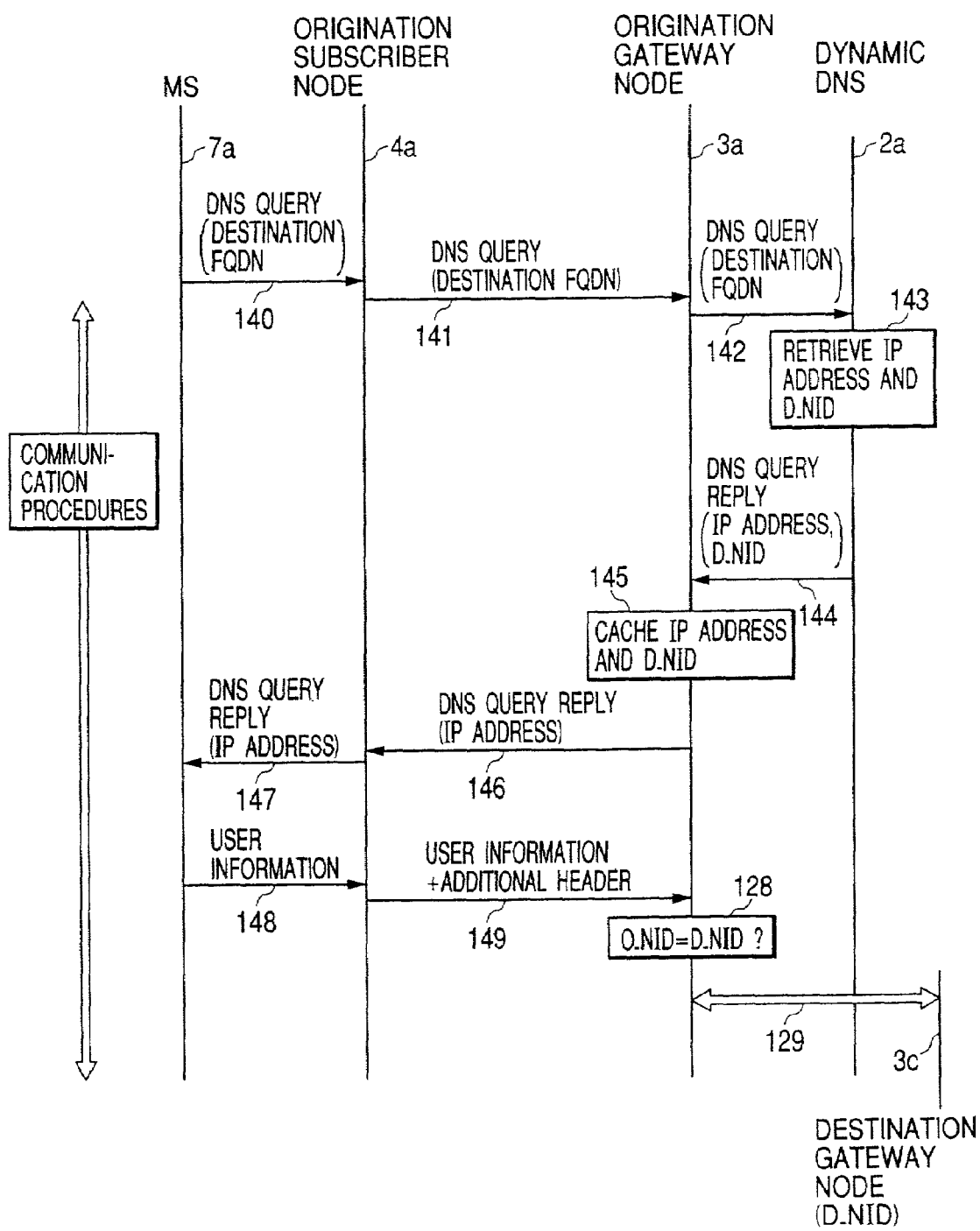
FIG. 17 is a flowchart for describing the communication procedure in a second embodiment of the present invention.

FIG. 17 shows the procedure for processings to be carried out in this second embodiment.

The procedure shown in FIG. 17 differs from that shown in FIG. 15 only in that the gateway node 3 monitors a DNS query issued from a terminal 7a to the dynamic DNS 2a and the gateway node 3a, when receiving a reply message from the dynamic DNS 2a in response to the DNS query, stores both IP address and destination network ID temporarily.

In this embodiment, neither the destination IP address field nor the destination network ID field is required as an entry for each IMSI in the user state management table 400 of the subscriber node 4. The destination network ID field 554 is omissible from the format of the packet 550 transferred between the subscriber node 4 and the gateway node 3 in this embodiment. However, the destination IP address field and the destination network ID field must be added as entries for each ISMI in the user management table 310 provided for the gateway node 3.

When the user of the mobile terminal 7a specifies a destination apparatus with its name so as to start communication, the IP address of the destination apparatus is identified from the name. The mobile terminal 7a, therefore, sends DNS query messages 140, 141, and 142 including the name (FQDN) to the dynamic DNS 2a via the subscriber node 4a and the gateway node 3a. The gateway node 3a then detects the TCP/UCP port number 53 and starts up the DNS query monitoring routine 60 shown in FIG. 11. Furthermore, the gateway node 3a detects that the OP code included in the header of the control message is "0" and stores the source IP address of the IP header of the received message 141 and the ID for identifying the request source temporarily, then waits for a reply message to be returned to the DNS query.

Receiving the DNS query message 142, the dynamic DNS 2a refers to the resource record table 200 so as to search the corresponding IP address and network ID with reference to the FQDN included in the received message 142 (step 143). In case the dynamic DNS 2a cannot reply to the query 142 by itself, the dynamic DNS 2a sends the query to the DNS server that manages upper domains, thereby obtaining both IP address and network ID corresponding to the FQDN from the DNS server that manages the domain to which the FQDN belongs.

Obtaining both IP address and network ID corresponding to the FQDN, the dynamic DNS 2a sends the reply message 144 including the IP address and the network ID to the gateway node 3a in response to the DNS query.

Receiving the reply message 144, the gateway node 3a writes the IP address and the network ID included in the received message 144 in the destination IP address field and the destination network ID field, which are entries corresponding to the source IP address in the user management table 310 (step 145). After that, the gateway node 3a sends reply messages 146 and 147 including the IP address corresponding to the FQDN to the mobile terminal 7a via the subscriber node 4a in response to the DNS query message.

Receiving the reply message 147, the mobile terminal 7a sets the IP address included in the received message 147 in the destination IP address field of the IP header and sends the IP packet including the user information 148 to the subscriber node 4a.

Receiving the IP packet 148, the subscriber node 4a reads the tunnel ID corresponding to the source IP address from the user state management table 400 and adds an additional header including the tunnel information to the user information to be transferred to the gateway node 3a via the connection between the subscriber node 4a and the gateway node 3a set in the origination procedure. The packet is thus transferred to the gateway node 3a (step 149).

Receiving the original user information, as well as the packet 149 including the additional header, the gateway node 3a removes the additional header, then reads the destination network ID corresponding to the destination IP address of the original IP packet header from the user management table 310 so as to compare the read destination network ID with the ID of the gateway node itself (step 128).

When the source and destination network IDs do not match, the gateway node 3a refers to the gateway node address table 300 so as to read the IP address of the destination gateway node 3c corresponding to the destination network ID. After that, the gateway node 3a transfers a packet configured by original user information, as well as an additional header including the IP addresses of both source and destination gateway nodes to the gateway node 3c (step 129).

According to the second embodiment of the present invention, therefore, it is possible to provide a terminating service to each mobile terminal that employs the dynamic IP address method without expanding the communication protocol used between a subscriber node and a gateway node.

Next, a third embodiment of the present invention will be described with reference to the accompanying drawings. This third embodiment employs means for obtaining a destination network ID corresponding to a destination IF address by sending a DNS query to a dynamic DNS 2 when a gateway node 3 receives a packet including user information.

Figure 18:
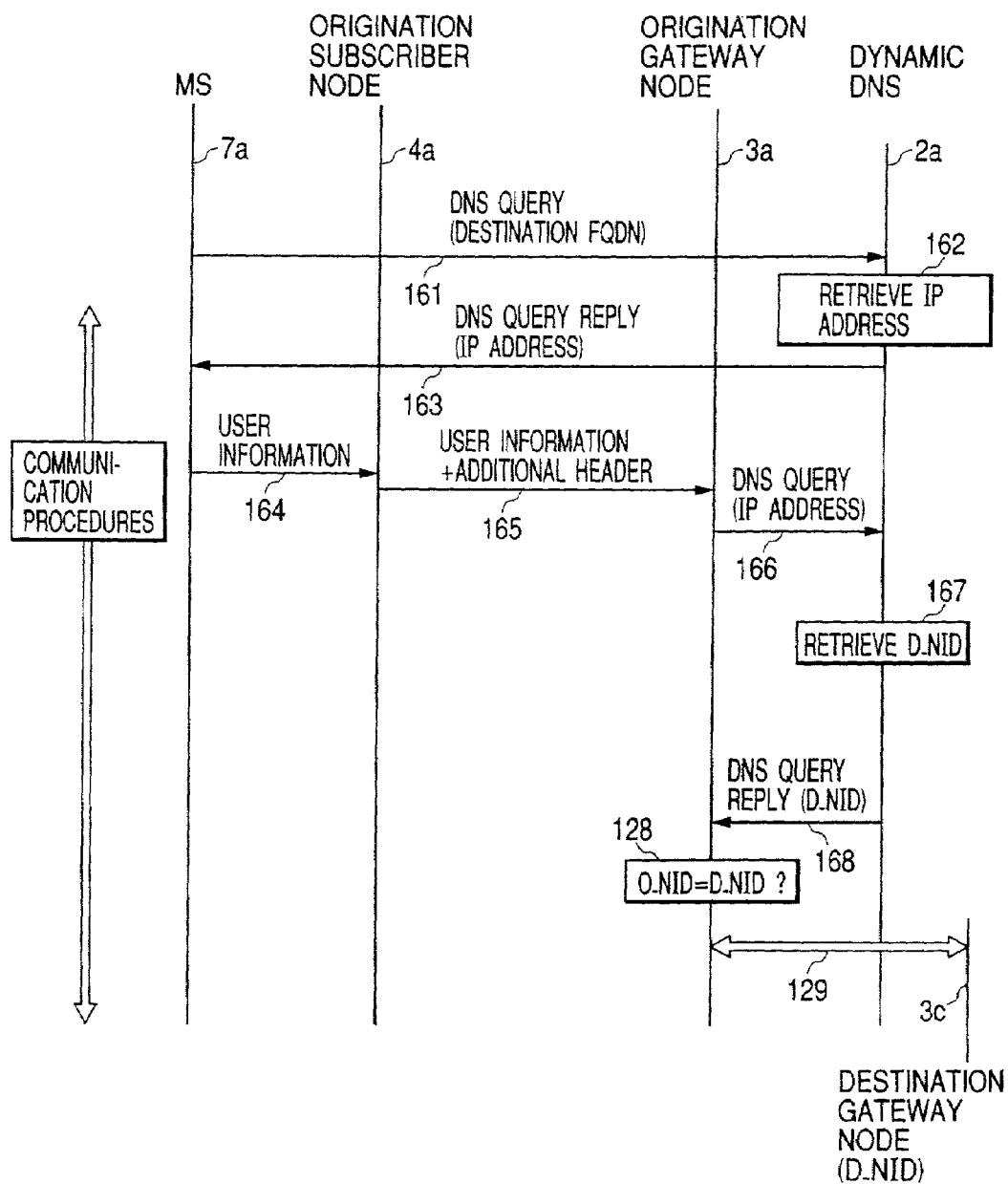
FIG. 18 is a flowchart for describing the communication procedure in a third embodiment of the present invention.
Figure 19:
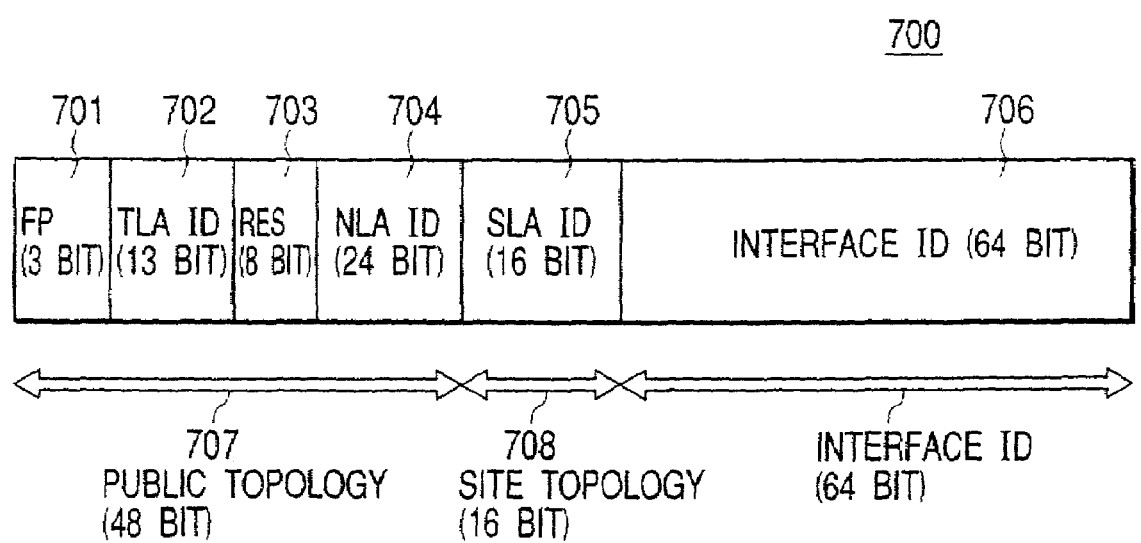
FIG. 19 is a format of IPv6 addresses.

FIG. 18 shows a procedure for executing processings in the third embodiment of the present invention.

The procedure shown in FIG. 18 is different from the procedure shown in FIG. 17 in that the gateway node 3a does not have the DNS query monitoring routine, but has means for asking the DNS about the destination network ID corresponding to a destination IP address when receiving user information.

When the user of the mobile terminal 7a specifies a destination apparatus with its name so as to start communication, the IP address of the destination apparatus is identified from the name. The mobile terminal 7a, therefore, sends a DNS query message 161 including the name (FQDN) to the dynamic DNS 2a.

Receiving the DNS query message 161, the dynamic DNS 2a searches the corresponding IP address with reference to the FQDN included in the received message 161 (step 162). In case the dynamic DNS 2a cannot reply to the query 161 by itself, the dynamic DNS 2a sends the query to the DNS server that manages upper domains, thereby obtaining both IP address and network ID corresponding to the FQDN from the DNS server that manages the domain to which the FQDN belongs.

Obtaining the IP address corresponding to the FQDN, the dynamic DNS 2a sends a reply message 163 including the IP address to the mobile terminal 7a in response to the DNS query message.

Receiving the reply message 161, the mobile terminal 7a sets the IP address included in the received message 163 in the destination IP address field of the IP header and sends a packet (164) including the user information to the subscriber node 4a.

Receiving the IP packet 164, the subscriber node 4a reads the tunnel ID corresponding to the source IP address from the user state management table 400 and adds an additional header including the tunnel information to the user information and transfers the user information to the gateway node 3a via the connection between the subscriber node 4a and the gateway node 3a, set in the origination procedure. The packet is thus transferred to the gateway node 3a (step 165).

Receiving the original user information, as well as the packet 165 including the additional header, the gateway node 3a removes the additional header, then sends a DNS query message 166 including the destination IP address set in the original user information to the dynamic DNS 2a.

Receiving the DNS query message 166, the dynamic DNS 2a refers to the resource record table 200 so as to read the network ID corresponding to the IP address (step 167), then sends a reply message 168 including the network ID to the gateway node 3a.

Receiving the message 168, the gateway node 3a compares the destination network ID with the ID of the gateway node itself (step 128).

In case the source and destination network IDs do not match, the gateway node 3a reads the IP address of the destination gateway node 3c corresponding to the destination network ID from the gateway node address table 300. After that, the gateway node 3a transfers a packet configured by the original user information, as well as the additional header including the IP addresses of both source and destination nodes to the gateway node 3c (step 129).

According to the third embodiment of the present invention, therefore, it is possible to provide the terminating service to each mobile terminal that employs the dynamic IP address method without adding a function for monitoring DNS queries to any of the subscriber and gateway nodes.

Next, a fourth description of the present invention will be described. In this fourth embodiment, the gateway node 3 is provided with the DNS query monitoring routine 60 shown in FIG. 11, as well as means for checking, when receiving a packet including user information, whether or not the destination network ID corresponding to the destination IP address is held in itself and obtaining the destination network ID corresponding to the destination IP address from the dynamic DNS 2 by sending a DNS query thereto in case the destination network ID is not held in itself.

This embodiment applies when the gateway node that has received a DNS query message 144 differs from the gateway node that has received a packet 149 including items of user information and an additional header. The gateway node that has received the user information, as well as the packet 149 including an additional header checks whether or not the gateway node holds the destination network ID corresponding to the destination IP address. When the gateway node does not hold the destination network ID, the gateway node sends a DNS query message 166 including the destination IP address set in the original user information to the dynamic DNS 2a as described in the above third embodiment. The subsequent processings are the same as those in the third embodiment.

According to the fourth embodiment of the present invention, therefore, it is possible to provide the terminating service for each mobile terminal that uses a dynamic IP address, since a gateway node that has not monitored a DNS query message related to the name of a communication destination, when receiving an original packet whose IP header includes the IP address of the communication destination that uses a dynamic IP address from an origination terminal, sends a DNS query to the dynamic DNS so as to obtain the network ID of the destination terminal.

As to be understood clearly from the description of the above embodiments, according to the present invention, it is possible to provide the terminating service to each terminal that uses a dynamic IP address. In addition, it is possible to use a mobile packet communication network effectively so that a network provider can provide the users with a packet communication service for between mobile terminals, as well as an application service that uses a function for terminating the packet transfer from a fixed network for each mobile terminal. Especially, because the IPv6 address is featured by the IP address autoconfiguration function, the present invention will be very effective when IPv6 addresses are used for terminals.

The invention claimed is:

1. A packet communication control apparatus connected via a network to a plurality of gateway apparatuses, a subscriber node, and a server for holding information on correspondence between IP addresses allocated to communication apparatuses and the names of those communication apparatuses, comprising:

means for monitoring a signal for sending a query from a first communication apparatus to the server about the address information of a second communication apparatus;

a memory for storing the address information of the second communication apparatus and an identifier of a home gateway apparatus which is set permanently for the second communication apparatus, said address information and said identifier of said home gateway apparatus being included in a reply signal returned from said server in response to said signal;

means for reading the identifier of said home gateway apparatus of the second communication apparatus from said memory when receiving a packet sent to the second communication apparatus from said first communication apparatus; and means for transferring said packet to a home gateway apparatus of the first communication apparatus after adding the identifier of said home gateway apparatus of the second communication apparatus;

wherein the home gateway apparatus of the first communication apparatus transfers the packet to the home gateway apparatus of the second communication apparatus according to the identifier thereof.

2. The packet communication control apparatus according to claim 1, wherein the server holds information on correspondence between IP addresses allocated to communication apparatuses, names of those communication apparatuses and identifiers of home gateway apparatuses of those communication apparatuses.

3. A gateway apparatus connected via a network to a first communication apparatus and a server for holding information on correspondence between IP addresses allocated to communication apparatuses and names of those communication apparatuses, comprising:

means for monitoring a signal for sending a query from the first communication apparatus to the server about the address information of a second communication apparatus;

a memory for storing the address information of the second communication apparatus and an identifier of a home gateway apparatus which is set permanently for the second communication apparatus, said address information and said identifier of said home gateway apparatus being included in a reply signal returned from said server in response to said signal;

means for reading the identifier of said home gateway apparatus of the second communication apparatus from said memory when receiving a packet sent to the second communication apparatus from said first communication apparatus; and means for transferring said packet to the home gateway apparatus of the second communication apparatus according to the identifier thereof.

4. The gateway apparatus according to claim 3, wherein the server holds information on correspondence between IP addresses allocated to the communication apparatuses, names of those communication apparatuses and identifiers of home gateway apparatuses of those communication apparatuses.

\* \* \* \* \*